United States Patent
Morken et al.

(10) Patent No.: US 6,221,970 B1
(45) Date of Patent: Apr. 24, 2001

(54) CURABLE PERFLUOROELASTOMER COMPOSITION

(75) Inventors: Peter Arnold Morken; Walter Werner Schmiegel, both of Wilmington, DE (US)

(73) Assignees: E.I. DuPont de Nemours and Company; DuPont Dow Elastomers, L.L.C., both of Wilmington, DE (US)

( * ) Notice: Subject to any disclaimer, the term of this patent is extended or adjusted under 35 U.S.C. 154(b) by 0 days.

(21) Appl. No.: 09/369,801

(22) Filed: Aug. 6, 1999

Related U.S. Application Data

(60) Provisional application No. 60/095,915, filed on Aug. 10, 1998.

(51) Int. Cl.[7] .............................. C08K 3/28; C08L 27/12; C08L 27/18

(52) U.S. Cl. ..................... 525/326.3; 525/350; 525/353; 525/370; 525/378; 525/380; 525/381

(58) Field of Search ................................ 525/378, 326.3, 525/350, 353, 370, 380, 381

(56) References Cited

U.S. PATENT DOCUMENTS

| | | | |
|---|---|---|---|
| 3,332,907 | 7/1967 | Angelo et al. | 260/47 |
| 3,956,000 | 5/1976 | Kuhls et al. | 106/270 |
| 4,242,498 | 12/1980 | Rosser et al. | 528/362 |
| 4,281,092 | 7/1981 | Breazeale | 526/247 |
| 4,394,489 | 7/1983 | Aufdermarsh | 525/370 |
| 4,879,362 | 11/1989 | Morgan | 526/247 |
| 5,565,512 | 10/1996 | Saito et al. | 525/340 |
| 5,677,389 | 10/1997 | Logothetis et al. | 525/340 |
| 5,688,872 | 11/1997 | Sonoi et al. | 525/350 |
| 5,693,748 | 12/1997 | Ikeda et al. | 528/421 |
| 5,789,489 | 8/1998 | Coughlin et al. | 525/370 |
| 5,789,509 | 8/1998 | Schmiegel | 526/247 |

FOREIGN PATENT DOCUMENTS

| | | |
|---|---|---|
| WO 95/02634 | 1/1995 | (WO) . |
| WO 95/22575 | 8/1995 | (WO) . |

*Primary Examiner*—Donald R. Wilson

(57) ABSTRACT

Curable perfluoroelastomer compositions are disclosed that comprise ammonia and uncured perfluorinated elastomers having copolymerized units of nitrile-containing cure site monomers. Such compositions are curable at low temperatures. In addition, curable perfluoroelastomer compositions are disclosed wherein ammonia functions as a cure rate accelerator in the presence of other curing agents.

7 Claims, No Drawings

CURABLE PERFLUOROELASTOMER COMPOSITION

CROSS REFERENCE TO RELATED APPLICATION

This application claims the benefit of U.S. Provisional Application 60/095,915 filed Aug. 10, 1998.

FIELD OF THE INVENTION

This invention relates to perfluoroelastomer compositions that are cured in the presence of ammonia.

BACKGROUND OF THE INVENTION

Perfluoroelastomers have achieved outstanding commercial success and are used in a wide variety of applications in which severe environments are encountered, in particular those end uses where exposure to high temperatures and aggressive chemicals occurs. These polymers are often used in seals for aircraft engines, in oil-well drilling devices, and in sealing elements for industrial equipment used at high temperatures.

The outstanding properties of perfluoroelastomers are largely attributable to the stability and inertness of the copolymerized perfluorinated monomer units that make up the major portion of the polymer backbones of these compositions. Such monomers include tetrafluoroethylene and perfluoro(alkyl vinyl) ethers. In order to develop elastomeric properties fully, perfluoroelastomers are typically crosslinked, i.e. vulcanized. To this end, a small percentage of cure site monomer is copolymerized with the perfluorinated monomer units. Cure site monomers containing at least one nitrile group, for example perfluoro-8-cyano-5-methyl-3,6-dioxa-1-octene, are especially preferred. Such compositions are described in U.S. Pat. Nos. 4,281,092; 4,394,489; 5,789,489; and 5,789,509.

Curing systems which incorporate tetraphenyltin have been successfully used to vulcanize nitrile-containing perfluoroelastomers, however, the cure rate of such compositions is too slow for economically effective commercial production of perfluoroelastomer articles in certain instances. Logothetis and Schmiegel, in U.S. Pat. No. 5,677,389, disclose the use of ammonium salts as accelerators for use in a variety of curing systems useful with perfluoroelastomers. Curable compositions containing the ammonium salts exhibit enhanced cure rate, but in some instances certain ammonium salt accelerators are not effective because of insolubility in the polymer. In addition, organometallic compounds are expensive. It would therefore be beneficial to have an alternative means for enhancing the cure rate of perfluoroelastomers which does not depend on the use of ammonium salt accelerators or require the use of organometallic compounds.

SUMMARY OF THE INVENTION

The present invention is directed to a process for curing a perfluoroelastomer composition comprising exposing an uncured perfluoroelastomer to ammonia for a time sufficient to crosslink the perfluoroelastomer said perfluoroelastomer comprising copolymerized units of (1) tetrafluoroethylene, (2) a perfluorovinyl ether selected from the group consisting of perfluoro(alkyl vinyl) ethers, perfluoro(alkoxy vinyl) ethers, and mixtures thereof, and (3) a cure site monomer selected from the group consisting of nitrile-containing fluorinated olefins and nitrile-containing fluorinated vinyl ethers.

The invention is further directed to a curable composition comprising

A. an uncured perfluoroelastomer comprising copolymerized units of (1) tetrafluoroethylene, (2) a perfluorovinyl ether selected from the group consisting of perfluoro(alkyl vinyl) ethers, perfluoro(alkoxy vinyl) ethers, and mixtures thereof, and (3) a cure site monomer selected from the group consisting of nitrile-containing fluorinated olefins and nitrile-containing fluorinated vinyl ethers; and B. a composition selected from the group consisting of ammonia and ammonia adsorbed on an inert support.

In another embodiment of the invention, a curative, other than ammonia, is present in the curable composition.

DETAILED DESCRIPTION OF THE INVENTION

The compositions of the present invention are based on elastomeric perfluoropolymers (hereinafter "perfluoroelastomers"), that is, substantially fully fluorinated fluoropolymers which, when cured, exhibit an elastomeric character. The perfluoroelastomers contain nitrile groups that render the polymers crosslinkable.

Perfluoroelastomers are polymeric compositions having copolymerized units of at least two principal perfluorinated monomers. Generally, one of the principal comonomers is a perfluoroolefin, while the other is a perfluorovinyl ether. Representative perfluorinated olefins include tetrafluoroethylene and hexafluoropropylene. Suitable perfluorinated vinyl ethers are those of the formula $$CF_2=CFO(R_fO)_n(R_{f'}O)_mR_f \qquad (I)$$

where $R_f$ and $R_{f'}$ are different linear or branched perfluoroalkylene groups of 2–6 carbon atoms, m and n are independently 0–10, and $R_f$ is a perfluoroalkyl group of 1–6 carbon atoms.

A preferred class of perfluoro(alkyl vinyl) ethers includes compositions of the formula $$CF_2=CFO(CF_2CFXO)_nR_f \qquad (II)$$

where X is F or $CF_3$, n is 0–5, and $R_f$ is a perfluoroalkyl group of 1–6 carbon atoms.

A most preferred class of perfluoro(alkyl vinyl) ethers includes those ethers wherein n is 0 or 1 and $R_f$ contains 1–3 carbon atoms. Examples of such perfluorinated ethers include perfluoro(methyl vinyl) ether and perfluoro(propyl vinyl) ether. Other useful monomers include compounds of the formula $$CF_2=CFO[(CF_2)_mCF_2CFZO]_nR_f \qquad (III)$$

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1.

Additional perfluoro(alkyl vinyl) ether monomers include compounds of the formula $$CF_2=CFO[(CF_2CF(CF_3))_n(CF_2CF_2CF_2O)_m(CF_2)_p]C_xF_{2x+1} \qquad (IV)$$

where m and n independently=1–10, p=0–3, and x=1–5.

Preferred members of this class include compounds where n=0–1, m=0–1, and x=1.

Examples of useful perfluoro(alkoxy vinyl) ethers include

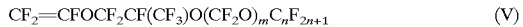

$$CF_2=CFOCF_2CF(CF_3)O(CF_2O)_mC_nF_{2n+1} \quad (V)$$

where n=1–5, m=1–3, and where, preferably, n=1.

Mixtures of perfluoro(alkyl vinyl) ethers and perfluoro (alkoxy vinyl) ethers may also be used.

Preferred perfluoroelastomers are composed of tetrafluoroethylene and at least one perfluoro(alkyl vinyl) ether as principal monomer units. In such copolymers, the copolymerized perfluorinated ether units constitute from about 15–60 mole percent of total monomer units in the polymer.

The perfluoropolymer further contains copolymerized units of at least one cure site monomer, generally in amounts of from 0.1–5 mole percent. The range is preferably between 0.3–1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful nitrile-containing cure site monomers include those of the formulas shown below.

$$CF_2=CF-O(CF_2)_n-CN \quad (VI)$$

where n=2–12, preferably 2–6;

$$CF_2=CF-O[CF_2-CF(CF_3)-O]_n-CF_2-CFCF_3-CN \quad (VII)$$

where n=0–4, preferably 0–2;

$$CF_2=CF-[OCF_2CFCF_3]_x-O-(CF_2)_n-CN \quad (VIII)$$

where x=1–2, and n=1–4; and $$CF_2=CF-O-(CF_2)_n-O-CF(CF_3)CN \quad (IX)$$

where n=2–4.

Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \quad (X)$$

i.e. perfluoro(8-cyano-5-methyl-3,6-dioxa-1-octene) or 8-CNVE.

The perfluoroelastomers suitable for use in the present invention may contain any of a variety of end groups as a result of the use of varying initiators or chain transfer agents during polymerization. For example, the polymers may contain sulfonate groups, sulfonic acid groups, carboxylate groups, carboxylic acid groups, carboxamide groups, difluoromethyl groups or trifluorovinyl groups.

The second component of the curable compositions of the invention is ammonia or ammonia adsorbed on an inert support. The ammonia may be in the form of a liquid (e.g., a solution of ammonia in an aqueous or non-aqueous solvent) or a gas. By an inert support is meant a composition that reversibly adsorbs ammonia and does not react chemically with the perfluoroelastomer composition or act to chemically degrade the perfluoroelastomer at temperatures up to 350° C. Examples of suitable inert supports include molecular sieves, carbon black, and silica gel. The ammonia acts as a curative for the perfluoroelastomer at temperatures over a wide temperature range, i.e. below 0° C. as well as at conventional cure temperatures of up to 300° C. Preferable compositions wherein the ammonia is adsorbed on an inert support are those which release ammonia at temperatures greater than the temperature at which the polymer is compounded with additives, for example 25° C.–200° C.

In another embodiment of the invention, the curable compositions will also include at least one other component that is capable of crosslinking the perfluoroelastomer, for example an organotin compound or certain amino group-containing benzene compounds. Suitable organotin compounds include allyl-, propargyl-, triphenyl- and allenyl tin curatives. Tetraalkyltin compounds or tetraaryltin compounds are the preferred curing agents for use in conjunction with nitrile-substituted cure sites. Tetraphenyltin is particularly preferred. The amount of curing agent employed will necessarily depend on the degree of crosslinking desired in the final product as well as the type and concentration of reactive moieties in the perfluoroelastomer. In general, about 0.5–10 phr of curing agent can be used, and 1–4 phr is satisfactory for most purposes. It is believed that the nitrile groups trimerize to form s-triazine rings in the presence of curing agents such as organotin, thereby crosslinking the perfluoroelastomer. Such crosslinks are thermally stable, even at temperatures of 275° C. and above.

A preferred cure system, useful for perfluoroelastomers containing nitrile-containing cure sites utilizes bis (aminophenols) and bis(aminothiophenols) of the formulas

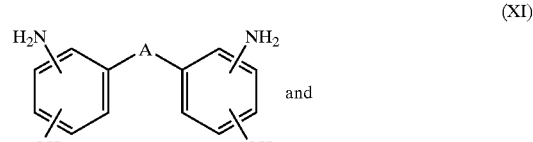

(XI)

and

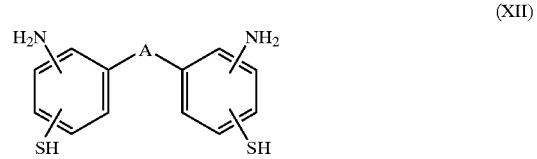

(XII)

and tetraamines of the formula

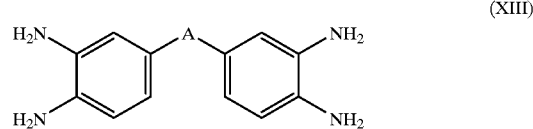

(XIII)

where A is $SO_2$, O, CO, alkyl of 1–6 carbon atoms, perfluoroalkyl of 1–10 carbon atoms, or a carbon-carbon bond linking the two aromatic rings. The amino and hydroxyl groups in formulas XI and XII above are interchangeably in the meta and para positions with respect to the group A. Preferably, the curing agent is a compound selected from the group consisting of 2,2-bis[3-amino-4-hydroxyphenyl] hexafluoropropane; 4,4'-sulfonylbis(2-aminophenol); 3,3'-diaminobenzidine; and 3,3',4,4'-tetraaminobenzophenone. The first of these preferred curing agents will be referred to as diaminobisphenol AF. The curing agents can be prepared as disclosed in U.S. Pat. No. 3,332,907 to Angelo. Diaminobisphenol AF can be prepared by nitration of 4,4'-[2,2,2-trifluoro-1-(trifluoromethyl)ethylidene]bisphenol (i.e. bisphenol AF), preferably with potassium nitrate and trifluoroacetic acid, followed by catalytic hydrogenation, preferably with ethanol as a solvent and a catalytic amount of palladium on carbon as catalyst. Of the members of the preferred class, a particularly preferred compound is 3,3'-diaminobenzidine. Carboxylated perfluoroelastomers cured in the presence of 3,3'-diaminobenzidine show unusually good solvent resistance, as evidenced by greater resistance to volume swell in certain solvents compared to perfluoroelastomers cured in the presence of other agents. The level of curing agent should be chosen to optimize the desired properties of the vulcanizate. In general, a slight excess of curing agent over the amount required to react with all the cure sites present in the polymer is used. Typically, 0.5–5.0 parts by weight of the curative per 100 parts of polymer is required. The preferred range is 1.0–2.5 parts.

Additives, such as carbon black, stabilizers, plasticizers, lubricants, fillers, and processing aids typically utilized in perfluoroelastomer compounding can be incorporated into the compositions of the present invention, provided they have adequate stability for the intended service conditions. In particular, low temperature performance can be enhanced by incorporation of perfluoropolyethers.

Carbon black fillers are used in elastomers as a means to balance modulus, tensile strength, elongation, hardness, abrasion resistance, conductivity, and processability of the compositions. In perfluoroelastomer compositions, small particle size, high surface area carbon blacks have been the fillers of choice. A grade commonly chosen is SAF carbon black, a highly reinforcing black with typical average particle size of about 14 nm and designated N 110 in Group No. 1, according to ASTM D 1765. A particular class of carbon blacks useful in the compositions of the present invention are those described in WO 95/22575. These carbon blacks have average particle sizes of at least about 100 nm to about 500 nm as determined by ASTM D 3849. Examples include MT blacks (medium thermal black) designated N-991, N-990, N-908, and N-907, and large particle size furnace blacks. MT blacks are preferred. When used, 1–70 phr of large size particle black is generally sufficient, and this amount does not retard cure time.

In addition, or in the alternative, fluoropolymer fillers may be present in the composition. Generally from 1 to 50 parts per hundred parts perfluoroelastomer (phr) of a fluoropolymer filler is used, and preferably at least about 5 phr is present. The fluoropolymer filler can be any finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature (s) of the perfluoroelastomer(s). Such finely divided, easily dispersed fluoroplastics are commonly called micropowders or fluoroadditives. Micropowders are ordinarily partially crystalline polymers.

Micropowders that can be used in the compositions of the invention include, but are not limited to, those based on the group of polymers known as tetrafluoroethylene (TFE) polymers. This group includes homopolymers of TFE (PTFE) and copolymers of TFE with small concentrations of at least one copolymerizable modifying monomer such that the resins remain non-melt-fabricable (modified PTFE). The modifying monomer can be, for example, hexafluoropropylene (HFP), perfluoro(propyl vinyl) ether (PPVE), perfluorobutyl ethylene, chlorotrifluoroethylene, or another monomer that introduces side groups into the polymer molecule. The concentration of such copolymerized modifiers in the polymer is usually less than 1 mole percent. The PTFE and modified PTFE resins that can be used in this invention include those derived from suspension polymerization as well as those derived from emulsion polymerization.

High molecular weight PTFE used in production of micropowder is usually subjected to ionizing radiation to reduce molecular weight. This facilitates grinding and enhances friability if the PTFE is produced by the suspension polymerization process, or suppresses fibrillation and enhances deagglomeration if the PTFE is produced by the emulsion polymerization process. It is also possible to polymerize TFE directly to PTFE micropowder by appropriate control of molecular weight in the emulsion polymerization process, such as disclosed by Kuhls et al. in U.S. Pat. No. 3,956,000. Morgan, in U.S. Pat. No. 4,879,362, discloses a non-melt-fabricable, non-fibrillating modified PTFE produced by the emulsion (dispersion) polymerization process. This polymer forms platelets on shear blending into elastomeric compositions, instead of fibrillating.

TFE polymers also include melt-fabricable copolymers of TFE having sufficient concentrations of copolymerized units of one or more monomers to reduce the melting point significantly below that of PTFE. Such copolymers generally have melt viscosity in the range of $0.5–60\times10^3$ Pa.s, but viscosities outside this range are also known. Perfluoroolefins and perfluoro(alkyl vinyl) ethers are preferred comonomers. Hexafluoropropylene and perfluoro(propyl vinyl) ether are most preferred. Melt fabricable TFE copolymers such as FEP (TFE/hexafluoropropylene copolymer) and PFA [TFE/perfluoro(propyl vinyl)ether copolymer] can be used, provided they satisfy constraints on melting temperature with respect to perfluoroelastomer processing temperature. These copolymers can be utilized in powder form as isolated from the polymerization medium, if particle size is acceptable, or they can be ground to suitable particle size starting with stock of larger dimensions.

A further preferred filler is anhydrous silica, generally an acidic silica or fumed silica. Such silicas are available from Degussa Aktiengesellschaft (Frankfurt, Germany) under the Aerosil® trademark. A particularly useful type is Aerosil® 200 silica. Other suitable silicas include Reolosil® silicas, available from Tokuyama KK (Tokyo, Japan) for example Reolosil® QS13 silica, Reolosil® QS102 silica, and Reolosil® QS30 silica. Amounts of 1–25 parts per hundred parts perfluoroelastomer (phr) are effective to reduce HF generation in cured compositions under service conditions. However, it is preferable to use no more than 1–7 phr because at higher concentrations of anhydrous silica the compression set resistance of cured perfluoroelastomer compositions containing the high concentrations deteriorates (i.e. increases), leading to high compression set and poor sealing characteristics. If less than 1 phr anhydrous silica is used, the degree of corrosion becomes unacceptable for many applications.

In one embodiment of the process of the invention, perfluoroelastomer is exposed to ammonia vapor. Generally, exposure is of a film of thickness less than 1 mm. Such films may be formed by a variety of methods. For example, the films may be cast from solution or formed from latex that has dried to a film. They may also be pressed from solid polymer. Ammonia vapor may also be passed over a thin coating, such as a film of a nitrile-containing perfluoroelastomer on a metallic or non-metallic substrate. During exposure to the ammonia vapor, the perfluoroelastomer film is crosslinked and the coating is immobilized or fixed. An especially preferred embodiment involves cure of the interior surface of an article, such as a tube, hose or pipe that has been coated with a thin layer of the ammonia-curable perfluoroelastomer, generally in a thickness of from 0.1–1 mm. In this embodiment ammonia vapor is conducted through the lined article at pressures and temperatures that depend on the cure rate requirements of the perfluoroelastomer. The lined article may be formed of any of a variety of materials, for example, an elastomer, a thermoplastic material, a fabric or a metal. An exterior surface coating may also be cured in the same manner.

The process may also be used to cure the surface of thicker articles, such as O-rings. This latter embodiment would preferably be used when the composition contains an additional curing agent. Exposure may be effected by placing the uncured perfluoroelastomer composition in a chamber to which ammonia gas is introduced. Alternatively, the uncured perfluoroelastomer compositions may be extruded and then passed through a tunnel or chamber containing ammonia gas. One skilled in the art will recognize that the concentration of ammonia and the time of exposure must be controlled depending on the level of cure site monomer in the polymer, the degree of crosslinking desired, and the desired physical properties of the cured composition, for example, the degree of compression set resistance desired or the desired degree of hardness. Generally, temperatures of up to 250° C. are useful to effect cure and temperatures of 25° C.–200° C. are preferred.

In addition to the advantages of low cure temperature, the process of the invention offers the advantages of cure by diffusion. This avoids exposure of the polymer to heat during blending with curatives and other additives. In traditional rubber compounding, the elastomer and additives are mixed on a rubber mill or in an internal mixer. This process generates heat and can lead to such adverse effects as premature vulcanization (scorch), cure before complete filling of a mold, or formation of distorted extrudates. Adverse additive interactions are also minimized by the process of the invention.

In a further embodiment of the invention, a perfluoroelastomer composition is compounded with a composition comprising ammonia adsorbed on an inert support. The compounded composition is then cured at a temperature of 50° C.–250° C. Compounding can be effected by any of the common rubber mixing techniques, for example on a two roll rubber mill or in an internal mixer, such as a Banbury internal mixer. Compounding is usually accomplished below the desorption temperature of the adsorbed ammonia, typically below 60° C. Curing may be in a mold or the polymer may be unconfined. Preferably, a post cure in air or nitrogen at temperatures above 200° C. for several hours is carried out to fully develop cure.

The curable compositions of the present invention are useful in production of laminates, gaskets, tubing, and seals. Such articles are generally produced by molding a compounded formulation of the curable composition with various additives under pressure, curing the part, and then subjecting it to a post cure cycle. The cured compositions have excellent thermal stability and chemical resistance. They are particularly useful in applications such as seals and gaskets for manufacturing semiconductor devices, and in seals for high temperature automotive uses.

The invention is illustrated by the following embodiments wherein all parts are by weight unless otherwise specified.

EXAMPLE

A perfluoroelastomer latex containing a perfluoroelastomer having copolymerized units of approximately 43.0 wt. % perfluoro(methyl vinyl) ether, 54.8 wt. % tetrafluoroethylene, and 2.2 wt. % 8-CNVE was prepared generally according to the process described in U.S. Pat. No. 5,789,489 using ammonium persulfate initiator and ammonium perfluorooctanoate surfactant. The polymer was isolated by coagulation with $MgSO_4$, washed twice with de-ionized water, and dried. Heptanol was used as a defoaming agent during the isolation step. The dried polymer was then heated for 1 hour at 300° C. in an air oven to remove carboxylate end groups and then its IR spectrum (on a film pressed at 121° C.) was recorded to confirm the removal of carboxylate. The IR spectrum showed the presence of the characteristically sharp nitrile stretching absorption of copolymerized 8-CNVE at about 2269 $cm^{-1}$, on the low frequency side of the thickness band centered at about 2370 $cm^{-1}$. There was no substantial absorption between 1600 and 1750 $cm^{-1}$.

A similar film of the same decarboxylated perfluoroelastomer was pressed at 121° C. and was suspended in ammonia vapor above a concentrated aqueous ammonium hydroxide solution and left overnight in a closed container at room temperature. The film was then removed and its IR spectrum was recorded. After exposure to ammonia, the nitrile absorption band at 2265 $cm^{-1}$ was absent and an intense band at 1654 $cm^{-1}$ and a weaker band at 3499 $cm^{-1}$ were present in the IR spectrum. The spectrum of the film was otherwise unchanged except for a reduction of a broad water band centered between 3200 and 3400 $cm^{-1}$ when dried for one hour with a stream of dry nitrogen in the spectrometer. The polymer film was examined for evidence of a change in rheology following the ammonia treatment. A sample of the film was folded and then subjected to the same high pressure between parallel plates under which the film had originally been formed. This attempt to cause the polymer to flow under pressure failed, indicating that the film was crosslinked. In addition, the elastomeric film could not be re-pressed at temperatures below 220° C., indicating the formation of ammonia-induced chemical crosslinks having excellent thermal stability.

As a control, a third film of the same perfluoroelastomer composition was subjected to ambient temperature water vapor exposure overnight in a closed container. This treatment caused only the IR spectral changes that are expected from physical absorption and adsorption of water. Compared to the IR spectrum of the perfluoroelastomer exposed to ammonia, the nitrile absorption was unchanged, no distinct absorption appeared in the 1600–1750 $cm^{-1}$ range, and the only substantial spectral difference was the presence of a broad water band centered between 3200 and 3400 $cm^{-1}$. The polymer film was easily re-pressable at 121° C., indicating that it was not crosslinked as the result of the exposure to water vapor.

What is claimed is:

1. A curable composition comprising

A. an uncured perfluoroelastomer comprising copolymerized units of
        (1) tetrafluoroethylene,
        (2) a perfluorovinyl ether selected from the group consisting of perfluoro(alkyl vinyl) ethers, perfluoro (alkoxy vinyl) ethers, and mixtures thereof, and
        (3) a cure site monomer selected from the group consisting of nitrile-containing fluorinated olefins and nitrile-containing fluorinated vinyl ethers; and
    B. ammonia adsorbed on an inert support.

2. A curable composition of claim 1 further comprising C) a compound, other than ammonia, capable of crosslinking the perfluoroelastomer.

3. A composition of claim 2 wherein the compound, other than ammonia, capable of crosslinking the perfluoroelas tomer is selected from the group consisting of organotin compounds, bis(aminophenol) compounds, bis(aminothiophenol) compounds and tetraamines.

4. A composition of claim 3 wherein the compound, other than ammonia, capable of crosslinking the perfluoroelastomer is tetraphenyltin.

5. A composition of claim 3 wherein the compound, other than ammonia, capable of crosslinking the perfluoroelastomer is diaminobisphenol AF.

6. A composition of claim 3 wherein the compound, other than ammonia, capable of crosslinking the perfluoroelastomer is 3,3'-diaminobenzidine.

7. A curable composition of claim 1 wherein the inert support is selected from the group consisting of molecular sieves, carbon black and silica gel.

* * * * *